United States Patent [19]
Aucsmith et al.

[11] Patent Number: 5,991,403
[45] Date of Patent: Nov. 23, 1999

[54] RECOVERABLE CRYPTOGRAPHIC TRANSFORMATION ON YUV DATA SUITABLE FOR COMPRESSIONS

[75] Inventors: David Aucsmith; Joseph M. Nardone, both of Portland, Oreg.; Robert Sullivan, Pleasonton, Calif.

[73] Assignee: Intel Corporation, Santa Clara, Calif.

[21] Appl. No.: 08/772,692

[22] Filed: Dec. 23, 1996

[51] Int. Cl.[6] .................................................. H04L 9/00
[52] U.S. Cl. .................................................. 380/10
[58] Field of Search ................... 380/9, 10, 20, 380/49

[56] References Cited

U.S. PATENT DOCUMENTS

| | | | |
|---|---|---|---|
| 5,237,610 | 8/1993 | Gammie et al. | 380/10 |
| 5,515,437 | 5/1996 | Katta et al. | 380/20 |
| 5,621,794 | 4/1997 | Matsuda et al. | 380/20 |
| 5,621,799 | 4/1997 | Katta et al. | 380/20 |
| 5,699,434 | 12/1997 | Hogan | 380/49 |

OTHER PUBLICATIONS

Clive E. Holborow, MPEG–2 Systems: A Standard Packet Multiplex Format for Cable Digital Services, pp. 25–33, (1994.

Hewlett Packard, MPEG–2 Digital Video Technology & Testing, pp. 1–16, 1995.

MPEG–1 Video, 2 pages. (1992).

*Primary Examiner*—Salvatore Cangialosi
*Attorney, Agent, or Firm*—Leo V. Novakoski

[57] ABSTRACT

A method for encoding MPEG compatible video data for subsequent compression comprises detecting a plurality of frames of video data organized as a GOP, generating an encryption key for the GOP, and encrypting the video data using GOP-synchronized substitution, transposition, and rotation transformations that are parameterized by offsets derived from the generated encryption key.

36 Claims, 10 Drawing Sheets

RECOVERABLE CRYPTOGRAPHIC TRANSFORMATION ON YUV DATA SUITABLE FOR COMPRESSIONS

RELATED PATENT APPLICATIONS

This patent application is related to U.S. patent application Ser. No. 08/740,976, entitled Key Management System for DVD Copyright Management, filed on Nov. 5, 1996 and hereby incorporated by reference.

BACKGROUND OF THE INVENTION

1. Technical Field

This invention relates to methods for processing video data, and in particular, to methods for encrypting video data for display on processor-based video systems.

2. Background Art

There is substantial interest in the computer and entertainment industries in incorporating video data into multimedia and related applications for use on processor-based video systems. Potential growth in this area has been enabled by the development of video compression schemes that reduce the bit rates required to display high quality video images and by the development of storage media, such as digital video discs (DVDs), which can accommodate data for an entire movie on a single disc.

Despite these advances in video compression and storage technologies, content providers have been reluctant to make their video works widely available for computer-based applications. This reluctance is attributable to the scant protection current processor-based video systems provide against the unauthorized acquisition and use of video data. For reasons discussed below, available encoding systems first compress and then encrypt video data prior to writing it to storage media. When the video data is subsequently decoded by a processor-based video system, the system must first decrypt and then decompress the video. This ordering of the decryption and decompression steps places video data on the processor system bus in compressed, unencrypted formats. In this state, it is a relatively simple matter to co-opt the video data for unauthorized uses.

The relative ordering of compression and encryption in the encoding process follows from the properties of the compression and encryption transforms conventionally employed. Compression is typically implemented on YUV-formatted video data in accordance with standards promulgated by the Moving Pictures Expert Group (MPEG, group ISO-IEC/JTC1 SC29/WG11) and the Joint Photographic Experts Group (JPEG, ISO/IEC International Standard 10918-1). Hereafter, MPEG is used to refer to MPEG-1 (ISO standard 11172), MPEG-2 (ISO standard 13818ISO), and JPEG compliant processes.

MPEG-compliant compression schemes reduce spatial and temporal redundancy in the video data by application of various lossy data transformations. Because lossy compression eliminates data from the video stream, it is commonly accepted that compressing encrypted data increases the likelihood that key data will be lost, preventing accurate decryption of the video data. It is also commonly accepted that encrypted data cannot be effectively compressed because encryption reduces the data redundancy on which compression methods operate. For these reasons, currently available encoding systems compress video data prior to encrypting it.

With the order of compression and encryption in the encoding process established by the above-considerations, the order of decompression and decryption in the decoding process is established by the non-commutation of the corresponding transformations. In particular, video data that is first compressed and then encrypted during encoding must be first decrypted and then decompressed during decoding. It is this ordering of the decryption and decompression processes that makes unencrypted video data available in both compressed and decompressed formats as it is transferred among the memory, video processor, and video rendering unit of conventional processor-based video systems. The sheer volume of uncompressed video data relative to compressed video data (100 G bytes versus 1.7 G bytes for a typical feature film) makes uncompressed data less useful to unauthorized users, despite its unencrypted state. However, the availability of unencrypted, compressed video data on the system bus severely compromises the ability of content providers to protect the integrity of their video products and control the uses to which it is put.

There is thus a need for video encoding and decoding systems that maintain data in a secure format at all points in the video decoding/display system where it is vulnerable to unauthorized acquisition.

SUMMARY OF THE INVENTION

The present invention is a system and method for processing video data that substantially reduces the availability of the video data for unauthorized uses in processor-based video systems. In accordance with the present invention, an encryption key is generated for each group of pictures (GOP) in a stream of video data. For each GOP, an encryption transform, parameterized by the encryption key of the GOP, is applied to the pictures of the GOP. Synchronizing the encryption transforms to the GOPs of the video data allows the encrypted video data to be subsequently compressed without loss of encryption information, using standard-compliant, i.e. MPEG, compression schemes.

BRIEF DESCRIPTION OF THE DRAWINGS

The invention may best be understood with reference to the following detailed description and the accompanying drawings in which.

DETAILED DISCUSSION OF THE INVENTION

The processes by which encoded video data is converted to images for display by processor-based video systems is determined, in part, by the processes used to encode the video data. In this discussion, encoding refers to the encryption and compression processes that transform video data into compact, secure formats for storage or transmission. Decoding refers to the inverse processes of decryption and decompression that are applied to the encoded video data to generate images for display.

In general, compression and encryption transforms do not commute. The practical consequence of this non-commutation is that video data encoded by applying a compression transform followed by an encryption transform must be decoded by first applying a decryption transform and then applying a decompression transform. Conventional encoding schemes compress video data prior to encrypting it. Accordingly, conventional decoding schemes must decrypt the video data prior to decompressing it. The ordering of encryption and compression transforms in conventional encoding processes (compression, encryption) has significant implications for the security of video data when it is subsequently decoded by conventional processor-based video systems. These implications may be best understood with reference to the following encode/decode systems.

Figure 1A:
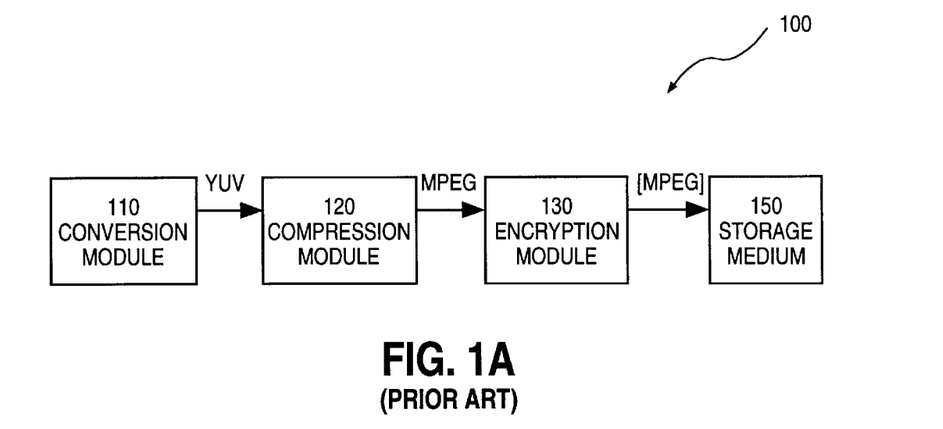
FIG. 1A is a block level representation of a conventional video data encoding system, including indications of the status of video data at various stages of the conventional encoding process.

Referring first to FIG. 1A, there is shown a block level diagram of a conventional system 100 for encoding video data for storage on a recording medium. The status of video data as it is transferred between different modules of system 100 is indicated. Encoding system 100 comprises a conversion module 110 for transforming Red-Green-Blue (RGB)-coded video data to a format suitable for processing by one of the known compression techniques. Typically, conversion module 110 converts video data into one of the various luminance, chrominance-coded formats. These luminance/chrominance formats may be designated as, for example, YUV or YCbCr. For the remainder of the discussion, the designation YUV is used to refer to any of the variants of luminance/chrominance formatted video data, and encrypted data is indicated by square brackets around the format designation.

Following conversion, a compression module 120 applies a lossy compression transform to the YUV data to eliminate spatial and temporal redundancies from the YUV-coded video signal. Compression module 120 may be a dedicated digital signal processor (DSP) or a general purpose processor under control of a compression program. In either case, module 120 implements an MPEG-compliant lossy compression scheme to generate a compressed video signal (MPEG). The compressed video signal is processed by encryption module 130, which generates an encrypted, compressed video signal ([MPEG]), suitable for storage on a high capacity storage medium 150. Encryption module 130 may be a dedicated DSP or a general purpose processor under control of an encryption program. Storage media 150 for [MPEG] include magnetic and optical storage media, such as digital video discs (DVDs).

Conventional encoding system 100 compresses video data prior to encryption for a number of reasons. Lossy compression of video data that has been encrypted by known encryption schemes may eliminate encryption key data. This loss of encryption key data makes decryption of the video data difficult, if not impossible. In addition, conventional encryption schemes inject a high degree of entropy into the video data. This increase in entropy is characterized by a corresponding decrease in the redundancy of the video data signal. Since compression schemes operate by eliminating spatial and temporal redundancy in the video data signal, encryption prior to compression tends to limit the amount by which encrypted video data can be compressed. These considerations establish the order in which conventional encoder 100 compresses and encrypts data as that indicated in FIG. 1A.

Figure 1B:
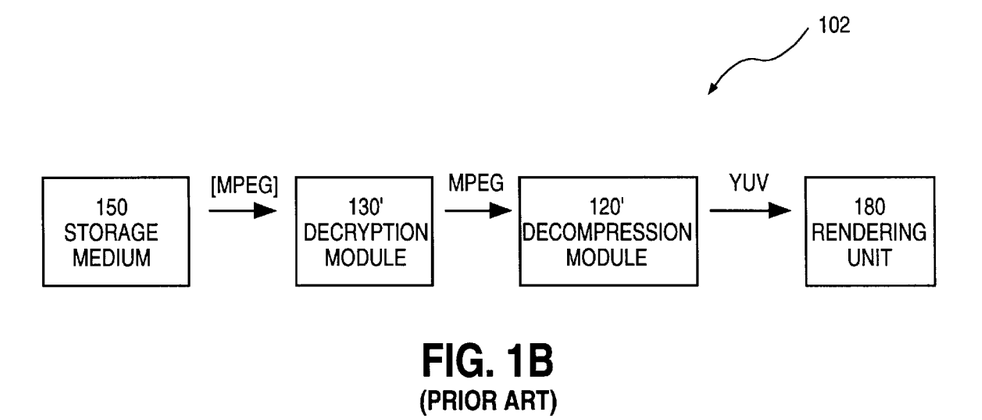
FIG. 1B is a block level representation of a conventional video data decoding system, including indications of the status of video data at various stages of the conventional decoding process.

The significance of this ordering can be appreciated by reference to FIG. 1B, which is a block level diagram of a processor-based video system 102 for decoding conventionally encoded video data. System 102 comprises a storage medium 150, decryption module 130', decompression module 120', and rendering unit 180' coupled through a bus (arrows). The state of video data at various phases of the decode process is indicated above the bus. Data is read from storage medium 150 in a compressed, encrypted MPEG format ([MPEG]). Decryption module 130', which may be a processor under control of a decryption program, converts compressed, encrypted video data ([MPEG]) into compressed, unencrypted video data (MPEG). Decompression module 120', which may also be a processor under control of a decompression program, converts the compressed video data to an uncompressed, unencrypted format (YUV) and transfers it to rendering unit 180 for display.

Video data is especially susceptible to sampling when it can be accessed in unencrypted MPEG format, as is the case in conventional system 102. Because the video data is both unencrypted and compressed, it can be readily diverted and stored for subsequent unauthorized uses, defeating the encryption process altogether. The only currently available means for eliminating compressed, unencrypted video data from the bus is to incorporate decryption and decompression hardware into rendering unit 180. This approach is less desirable than software based methods, since it limits system 102 to video data processed with decryption and decompression algorithms specific to the hardware provided in rendering unit 180.

The present invention includes an encoding scheme that eliminates unencrypted, compressed video data from the bus(es) of processor-based video systems during decoding. The encoding scheme employs an encryption process that is synchronized to the data format of JPEG/MPEG-compliant compression schemes, allowing the video data to be encrypted prior to compressing it. This reverses the compression/encryption order employed in conventional encoding schemes, and enables the video display system to maintain the video data in an encrypted format, even after it has been decompressed by the video processor.

In one embodiment of the invention, decryption is implemented in the rendering unit of the video processor based system, eliminating unencrypted data completely from the system bus. In an alternative embodiment, a video processor implements the decryption scheme following decompression, so that unencrypted video data is available on the bus in only an uncompressed format. In this embodiment, the sheer volume of video data (approximately 110 G bytes v. 1.7 G bytes when compressed) makes it impractical to download the video data for unauthorized purposes.

Figure 3A:
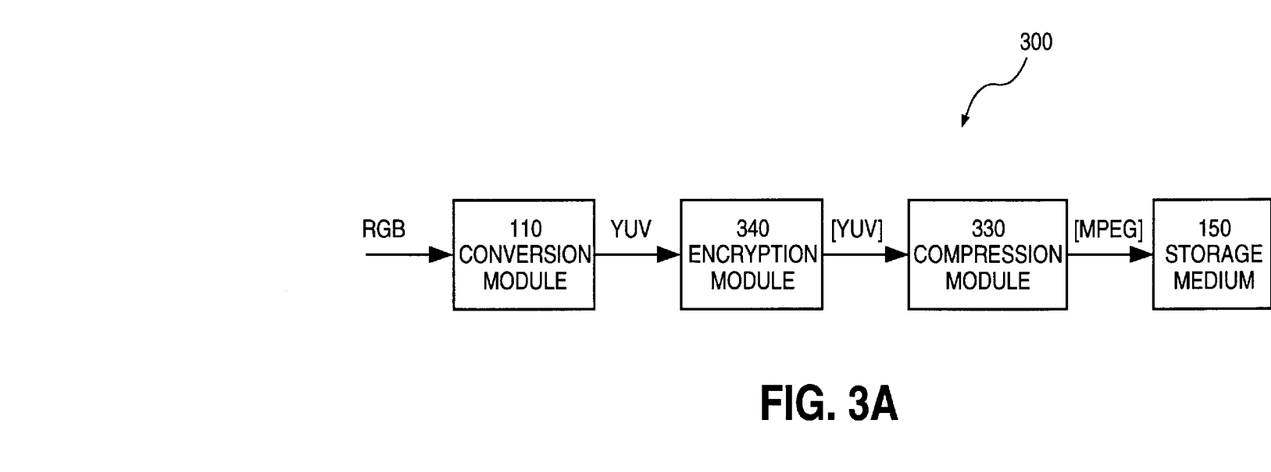
FIG. 3A is a block level diagram of an encoding system in accordance with the present invention, including indications of the status of video data at various stages of the encoding process.

Referring now to FIG. 3A, there is shown a block level diagram of an encoding system 300 in accordance with the present invention. In order to highlight the features of the present invention, comparable modules in FIGS. 1A and 3A are identified by the same reference numbers and the format of data generated by different steps is indicated. In particular, system 300 comprises a conversion module 110 and a storage medium 150 similar to those of conventional encoding system 100. However, encoding system 300 transfers YUV-formatted video data from conversion module 110 to a synchronous encryption module 340, which generates encrypted YUV data ([YUV]). This data is subsequently transferred to compression module 330, which generates encrypted, compressed video data ([MPEG]) for storage on medium 150. Thus, encoding system 300 encrypts video data prior to compressing it.

Figure 3B:
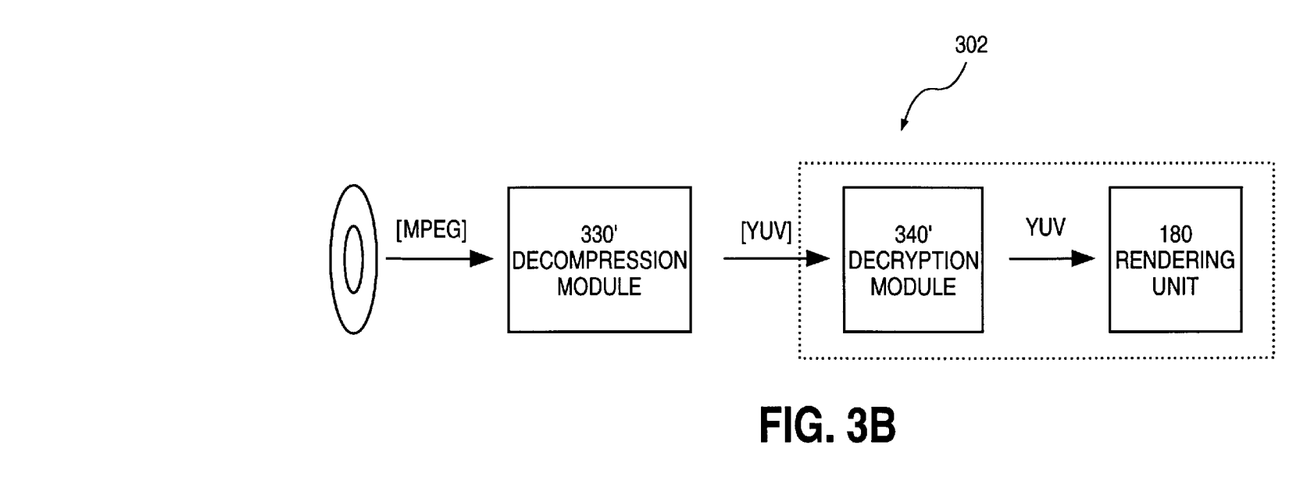
FIG. 3B is a block level diagram of a decoding system in accordance with the present invention, including indications of the status of video data at various stages of the decoding process.

The significance of encoding system 300 may be appreciated by reference to FIG. 3B, which is a block level diagram of a decoding system 302, suitable for processing video data encoded by system 300. The format of video data at various stages of the decode process is also indicated in FIG. 3B. Thus, compressed, encrypted video data ([MPEG]) is read from storage medium 150 by decompression module 330', which converts it to encrypted, decompressed video data ([YUV]). Decompression module 330' may be a processor under control of a decompression program or a dedicated DSP. In either case, data transfers are accomplished by a bus (arrow) associated with the processor/DSP. The encrypted, decompressed video data ([YUV]) is transferred to a decryption module 340', which converts it to an unencrypted, decompressed data format (YUV) for display by rendering unit 180. Decryption module 340' may be a processor under control of a decryption program or dedicated decryption logic. In either case, no data appears on the bus in unencrypted, compressed format.

Figure 3C:
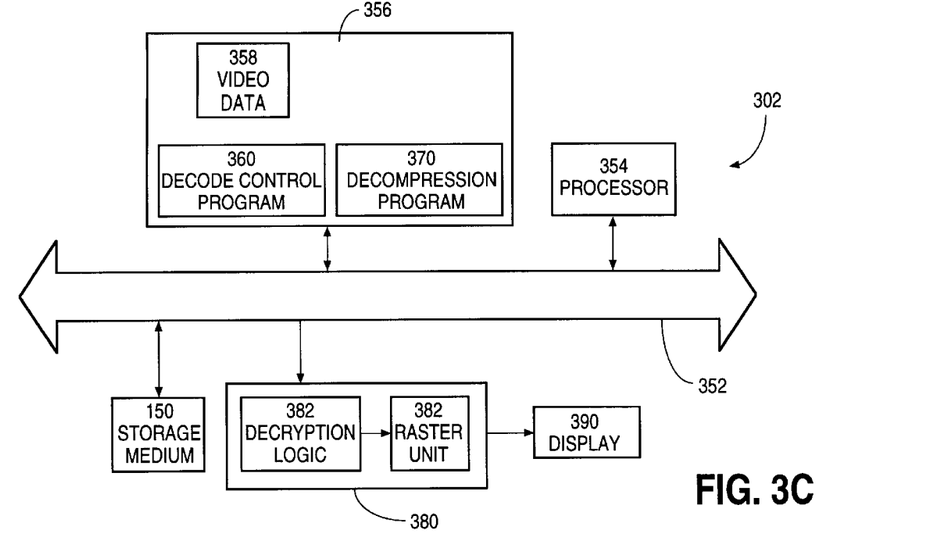
FIG. 3C is a block diagram of one embodiment of a processor-based system for decoding video data encoded by the method of the present invention.

Referring now to FIG. 3C, there is shown one embodiment of a processor based video system 302 in accordance with the present invention, for decoding video data encoded by system 300. System 302 includes an I/O device 350 for reading video data from a storage medium (not shown), video processor 354, memory 356, bus 352, rendering unit 380, and display 390. Memory 356 includes a decode control program 360 and a decompression control program 370. Video data 358 may also be stored temporarily in memory 256 during decryption and decompression. A decryption logic unit 382 is associated with rendering unit 380 and corresponds to decryption module 340 of FIG. 3B.

Decryption logic unit 382 implements decryption algorithms that are synchronized to the GOPs of video data, and decode control program 360 provides synchronization data from decompression control program 370 to decryption logic unit 382. Decryption logic unit 382 includes logic for inverting the GOP synchronized encryption transformations used to encode video data. The implementation of decryption logic unit 382 in association with rendering unit 382, in system 302 allows video data to remain fully encrypted until just before it is processed by a raster unit 382 of rendering unit 380. In this embodiment, no unencrypted video data appears on bus 352.

Figure 3D:
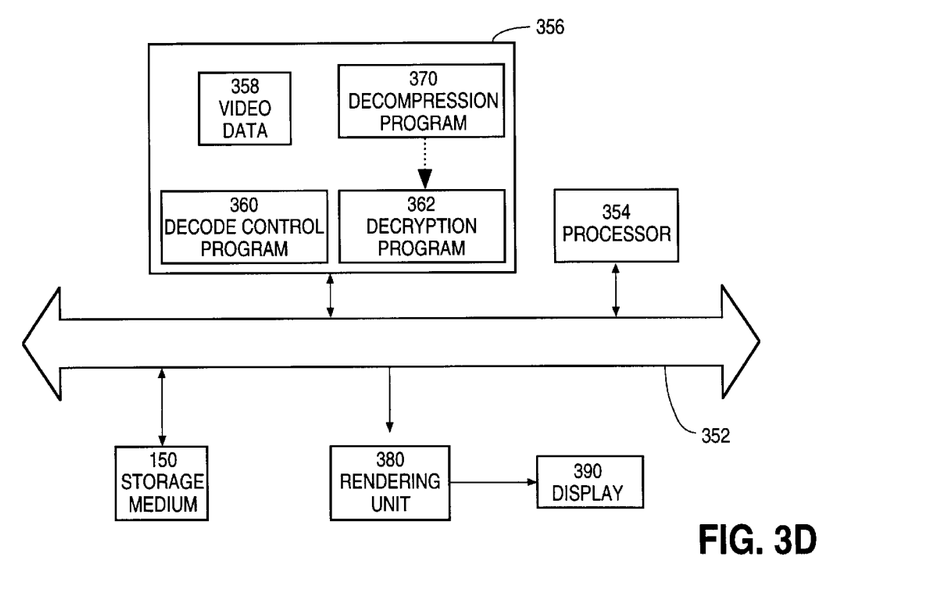
FIG. 3D is block diagram of another embodiment of a processor-based video system for decoding video data encoded by the method of the present invention.

Referring now to FIG. 3D, there is shown an alternative embodiment of system 302 (system 302') for decoding video data encoded by system 300. In this embodiment, decryption is implemented by processor 354 operating under control of a decryption program 362 in memory 356. As indicated by the arrows, video processor 354 applies decompression program 370 prior to decryption program 362, and decode control program 360 coordinates synchronization data between decryption and decompression programs 362, 370. System 302' thus allows unencrypted video data on bus 352 only in an uncompressed format, in which case the sheer volume of uncompressed video data prevents its unauthorized diversion and storage.

In sum, encoding system 300 in conjunction with processor-based video systems 302, 302' maintain the video data available on bus 352 in forms that prevent unauthorized use. This is accomplished through encryption/decryption transforms that survive lossy compression by encrypting data in synchronization with the GOPs within which standard-compliant compression schemes operate. In particular, encryption module 340 implements an encryption transform on YUV data that is effectively transparent to the compression transform implemented by compression module 330. The encrypted YUV data retains the GOP structure of unencrypted YUV data that is used by MPEG-compliant schemes for lossy compression. This synchronization ensures that the encryption scheme is not affected by subsequent compression in encoding system 300 or decompression in video systems 302, 302'. Decryption may thus be postponed until later in the decoding process without compromising the accuracy or quality of the image.

In the following discussion, GOP indicates the group of pictures or individual video frames that are associated for purposes of inter-frame and intra-frame compression. GOPs may also be referred to as I-frames in other references. The terms, picture and frame, are used interchangeably.

In order to fully appreciate the GOP synchronized encryption implemented by present invention, it is useful to summarize the format of MPEG-compliant video data.

Figure 2A:
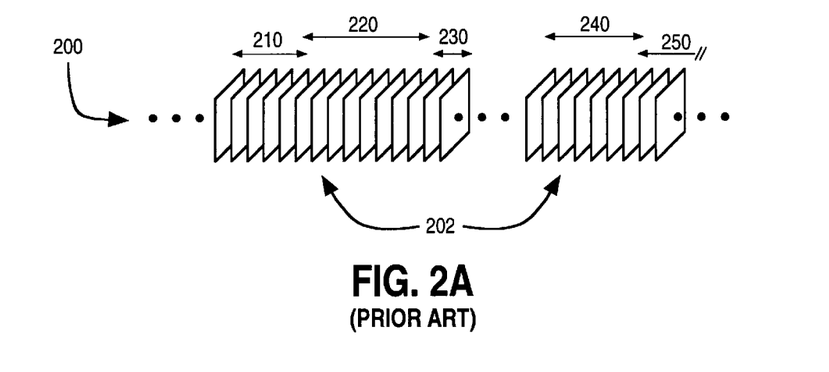
FIGS. 2A–2C are schematic diagrams indicating the GOP structure and macroblock organization of luminance, chrominance video data formatted in accordance with MPEG standards.

Referring now to FIG. 2A, there is shown a schematic representation of a YUV video signal 200 comprising a plurality of frames 202 of YUV-formatted data organized as a series of GOPs 210, 220, 230, 240, 250. GOPs group together frames 202 that represent closely related images in video signal 200. For example, frames 202 having a relatively fixed background scene may be grouped into one GOP. Subsequent frames generated when the background scene changes or the camera angle from which the scene is viewed changes, are grouped into a new GOP. Methods for defining GOPs are well known and are not discussed in greater detail here.

Figure 2B:
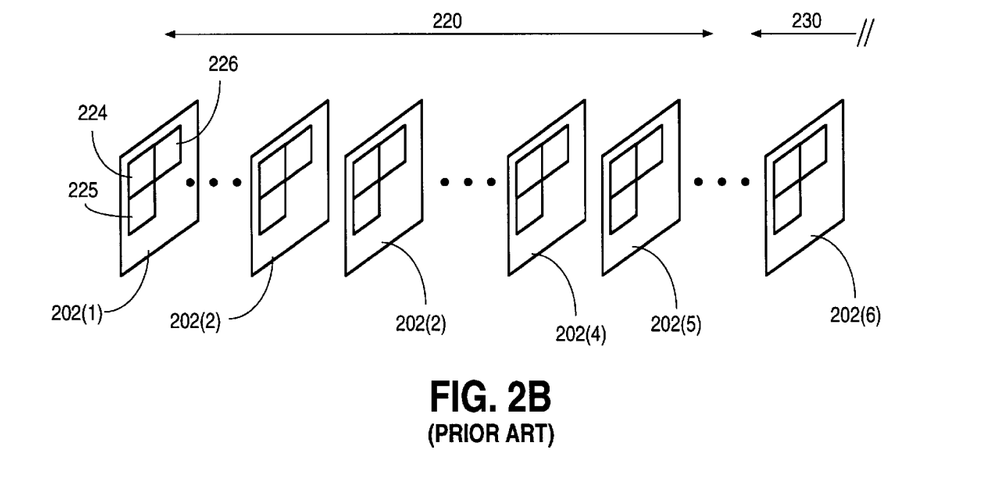

Referring to now to FIG. 2B, there is shown a more detailed view of the format of a GOP 220 in accordance with MPEG standards. The format of the video data is selected to facilitate inter-frame and intra-frame compression techniques employed in MPEG conforming compression methods. In particular, GOP 220 comprises video frames 202(1) –202(5), which are characterized as I-pictures (202(1)), B-pictures (202(2), 202(3), 202(5)), or P-pictures (202(4)), according to the type of compression coding to be applied. The different compression techniques applied to different frames 202(1)–202(5) within GOP 220 facilitate different operations on the video stream and allow compression to be maximized in those frames best suited for high compression.

For example, I-picture 202(1) is compressed using intra-frame coding, in which the frame pixels are subjected to a discrete cosine transform (DCT), quantization, and e.g. Huffman encoding. I-pictures are not encoded by reference to any other frame 202(2)–202(5) of GOP 220. P-picture 202(4) is compressed using motion compensated prediction from I-picture 202(1) or any other P-picture that may precede it in GOP 220. Motion compensation generates a highly compressed predictive frame (not shown) that is then subjected to DCT, quantization, and Huffman encoding. B-pictures 202(2), 202(3), 202(5) are compressed using motion compensated prediction based on preceding or subsequent I-pictures and P-pictures within GOP 220. The resulting predictive frame (not shown) is also subsequently compressed by DCT, quantization, and Huffman encoding. Significantly, none of frames 202(1)–202(5) of GOP 220 are compressed by reference to frames outside of GOP 220. Compressing frames solely by reference to other frames within the same GOP (closed GOP) is characteristic of MPEG conforming compression schemes.

Figure 2C:
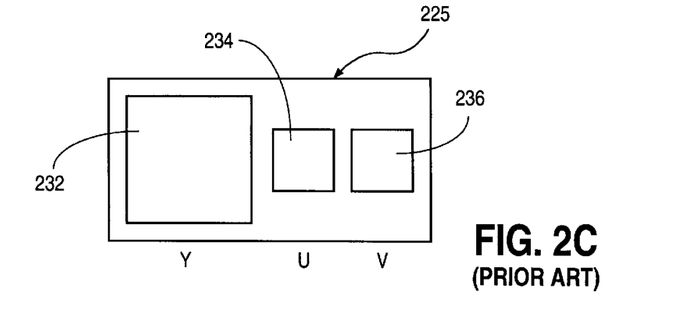

In order to facilitate compression, the pixels of each frame 202(1)–202(5) within GOP 220 are further organized into macroblocks 224–226. Referring now to FIG. 2C, there is shown macroblock 225 indicating different YUV components 232, 234, 236 in one of the luminance/chrominance subsampling formats. In the disclosed figure, the YUV data is in a 4:2:0 subsampling format, reflecting the different size luminance (Y) and chrominance (U, V) blocks within macroblock 225. Other YUV subsampling formats include 4:2:2 and 4:4:4, which are also suitable for use with the present invention. MPEG-conforming compression methods employ both the macroblock organization of individual frames 202(1)–202(5) and the organization of frames 202(1)–202(5) as GOP 220 to facilitate video data compression. These compression techniques and their relationship to the GOP format of video data, are well-known. They are described, for example, in Bhaskaran & Konstantinides, *Image Compression And Video Standards: Algorithms and Architectures*, Kluwer Academic Publishers, Norwell, Mass. (1995), which is hereby incorporated by reference in its entirety.

The present invention exploits the GOP and macroblock structures of MPEG and related video standards to provide encrypted video data that survives compression and decompression by MPEG-conforming encoders and decoders, respectively. In particular, the present invention applies to MPEG formatted video data one or more transformations that are keyed to the GOP structure of the video data. The transformations encrypt YUV video data using encryption keys selected for each GOP to produce encrypted data that preserves both the GOP organization of the component frames and the macroblock organization of YUV data within the component frames. Although the invention is described in the context of MPEG-compliant compression schemes, it may also be adapted for compression schemes based on structures comparable to the macroblock and GOP organization of MPEG-compliant schemes.

Figure 4:
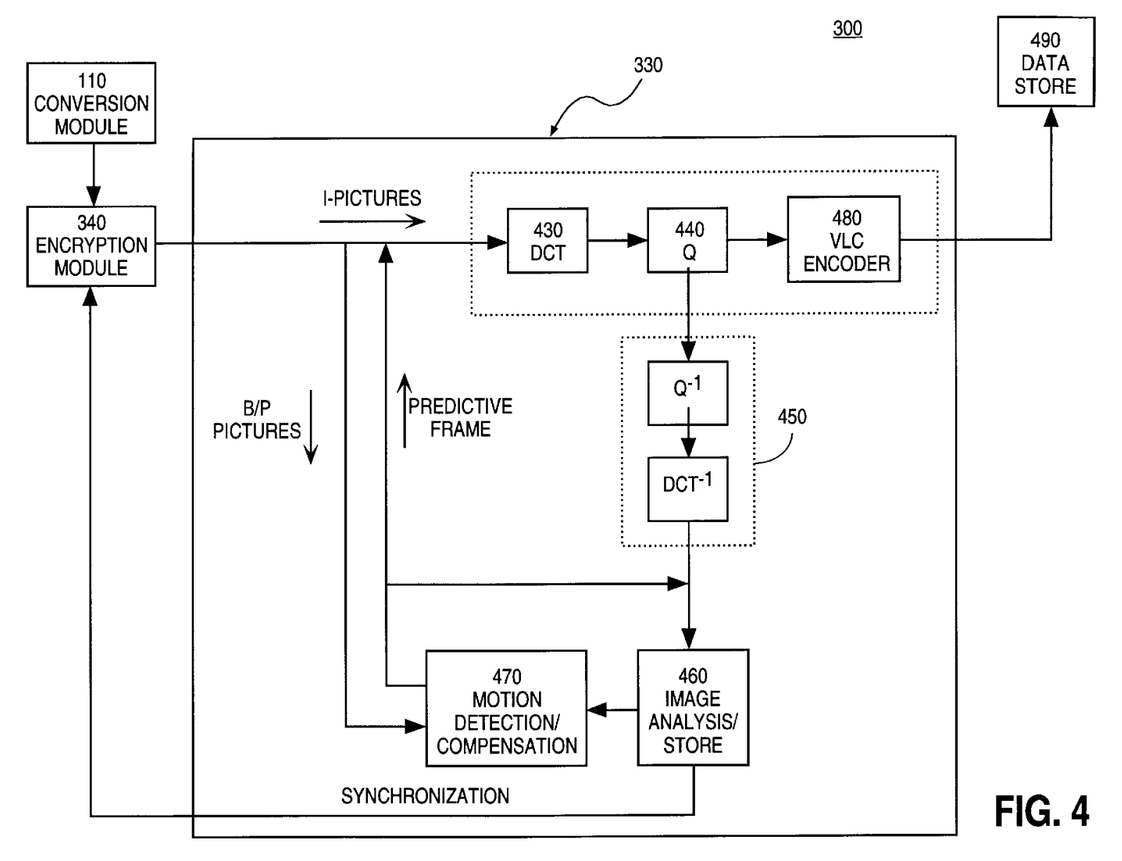
FIG. 4 is a schematic diagram of an encoding system in accordance with the present invention.

Referring now to FIG. 4, there is shown a more detailed diagram of encoder 300, including encryption module 340 and compression module 330 in accordance with the present invention. Also shown is a conversion module 110, for transforming RGB-coded data to YUV-coded data for encryption by module 340. YUV-formatted video data is encrypted by module 340 and coupled to compression module 330 for compression and storage. A synchronization signal (SYNC) is provided from compression module 330 to encryption module 340 to synchronize the encryption transforms implemented by module 340 with the GOP generation process implemented by compression module 330. Detailed discussions of the encryption transforms implemented by encryption module 340 are provided in conjunction with FIGS. 5–8.

Encryption module 340 generates an encryption key for each GOP in the YUV data stream and encrypts each frame of the GOP using an encryption transform parameterized by the encryption key. The encryption transforms implemented by module 340 are selected to preserve the GOP and macroblock structure of video data employed by module 330 for compression. This makes the encryption transforms transparent to the compression transforms, allowing encryption to precede compression in the encoding process.

Compression module 330 includes a motion detection/compensation module 470 for implementing motion-compensated, inter-frame compression, as well as DCT and quantization (Q) modules 430, 440, respectively, for implementing intra-frame compression. A variable length decoder 480 further encodes compressed video data for storage medium 150.

As part of the compression process, compression module 330 monitors image quality and determines when a new GOP should be generated in the incoming stream of YUV video data. For this purpose, compression module 330 typically includes a decompression module 450 to regenerate images from compressed video data. Regenerated images are provided to an image analysis/store module 460 for motion compensation and quality analysis. When compression produces images that fail to meet a required quality threshold, compression module 330 asserts SYNC to encryption module 340, indicating that a new GOP should be initiated. Methods for generating predictive frames and monitoring image quality are well-known and are not discussed in greater detail here.

When SYNC is asserted, encryption module 340 generates a new encryption key, parameterizes the encryption transformation(s) using an offset derived from the new encryption key, and applies the encryption transformation to all frames of the new GOP. The process of key generation and encryption transformation according to the generated key is repeated whenever compression module 330 indicates the start of a new GOP.

The present invention contemplates a number of GOP synchronized encryption transforms, suitable for implementation by encryption module 340. Characteristic of the contemplated transforms is the use of an encryption key, generated for each GOP to parameterize encryption transforms of all frames within the GOP. For example, a substitution transformation, a macroblock transposition transformation, and a rotation transformation in YUV space are considered in the following discussion. These transformations or similar GOP synchronized, key encrypted transformations may be implemented alone or in combination by encryption module 340 in accordance with the present invention.

In the substitution transformation, an offset value is derived from the encryption key, each data value within a frame is modified by the offset value, and the modified data values are substituted in the frame for the original data values. The use of a constant offset value for each frame of the GOP provides a random component to the video data at a GOP level of resolution. That is, pixel data within each GOP is modified uniformly by the associated offset value, and the offset value varies randomly from GOP to GOP.

Uniform treatment of the frame data within a GOP allows the data to be decrypted without error despite the subsequent compression step. Because the offset is applied uniformly to the pixel data of the GOP being encrypted, it appears only in the DC components of the GOP data when it is DCT encoded. During the subsequent quantization step, the DC component is not affected by lossy compression. Offsets are thus fully recovered when the inverse DCT ($DCT^{-1}$) is applied.

In the macroblock transposition transformation, an offset vector is derived from the encryption key of the GOP, and each macroblock of data within the frames of the GOP is shifted in accordance with the offset vector. For this transformation, the macroblocks of a frame are viewed as a two dimensional grid of macroblocks. An offset vector such as 2X-3Y would shift each macroblock 2 positions in the positive X direction and 3 positions in the negative Y direction of the two dimensional grid. Macroblocks shifted off one edge of the grid would be wrapped around to the opposite edge. Where both substitution and transposition transforms are implemented by encryption module 340, the transposition vector may be derived from the same GOP encryption key as the offset value to reduce the overhead necessary to decrypt the encoded data.

Transposition of the pixel data of a frame on a macroblock scale is also transparent to compression transforms. In particular, motion compensation analysis is applied on a macroblock scale and the predictive analysis is done using only the frames of a GOP. Consequently, the transposed macroblock configuration of each frame is recovered following a compression/decompression cycle and the original macroblock configuration may be subsequently recovered by applying the transposition transform with the offset vector reversed, i.e. −2X+3Y in the above example.

A rotation transformation in color space may also be implemented by encryption module 340, alone or in combination with substitution or transposition transformations. In this case, each data point in YUV space is modified by deriving three rotation angles from the encryption key, generating rotated YUV axes from the rotation angles, and determining the Y, U, and V components of the data point in the rotated YUV coordinates. The same rotation is used for each frame of pixel data in the GOP.

Color space rotation scrambles all pixel data within a given GOP so that the luminance and chrominance components are randomized from one GOP to the next. This color space rotations preserve the "color volume" but may lead to saturation effects if rotated Y, U, or V values exceed threshold values in the original color space. This can be avoided by mapping selected points of the rotated color space to volumes of the rotated color space that fall within the saturation thresholds, ignoring data points that exceed a maximum value, or approximating these data points by a maximum value. Methods for mapping the color spaces are discussed in greater detail below, in conjunction with FIG. 8.

Following application of one or more of these or comparable GOP synchronized encryption transformations by encryption module 340, the data is compressed by compression module 330, as described above. Where multiple GOP synchronized encryption transformations are applied, the relative order of their application to the video data may be varied as needed to optimize encryption/decryption efficiency. In addition, while multiple encryption transformations have been described, any one of these transformations by itself may suffice to encrypt the data against unauthorized uses.

Figure 5:
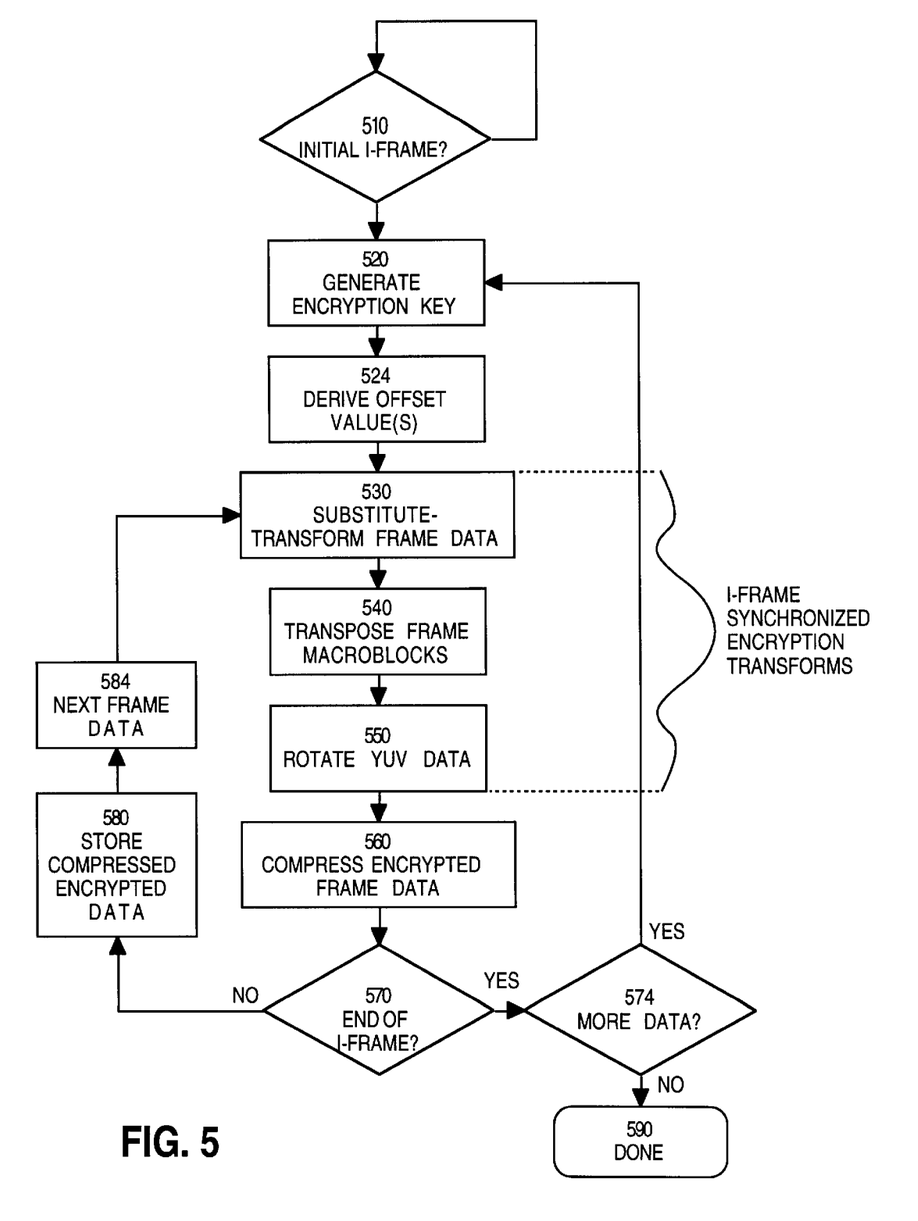
FIG. 5 is a flowchart of an embodiment of an encoding method in accordance with the present invention.

Referring now to FIG. 5, there is shown a flowchart of a method 500 implemented by encryption module 340 in accordance with the present invention. Schematic representations of substitution step 530, transposition step 540, and rotation step 550 are provided in FIGS. 6, 7, and 8, respectively.

Referring first to FIG. 5, when a GOP is detected 510, an encryption key is generated 520. The key may be generated 520, for example, by a random number generator or comparable device. Once the encryption key for a GOP is generated 520, an offset value is derived 524 from the key. In an embodiment of method 500 that incorporates a substitution transformation, the encryption key is divided into a pair of indices, which identify a row and column in an S-box substitution table. The offset value at the row and column location specified by the indices is added to all YUV data in a frame and the modified YUV data is substituted 530 for the YUV data. The S-Box substitution table is discussed in greater detail below, in conjunction with FIG. 6.

Figure 7:
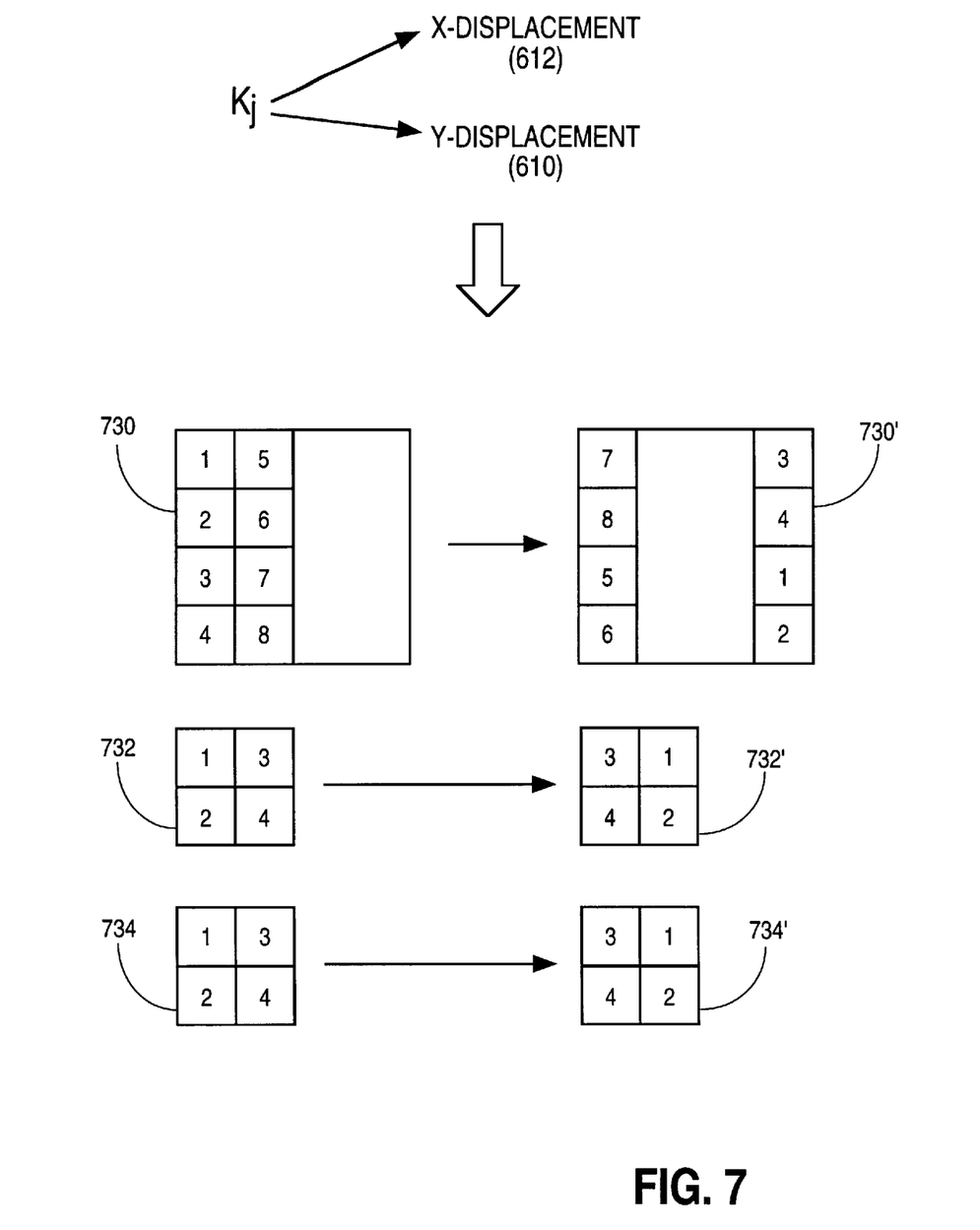
FIG. 7 is a schematic diagram of a synchronized transposition transformation in accordance with the present invention.

Following substitution transformation step 530, a macroblock transposition is applied 540 to the frame. A transposition vector, associated with the GOP and comprising X and Y displacements, is applied to each macroblock of the frame. In a preferred embodiment of method 500, the transposition is derived from the encryption key of step 520 to reduce the amount of data overhead necessary to subsequently decrypt the encrypted data. In particular, the location indices employed to identify a row/column position in the S-box, may also provide the X and Y displacements of the transposition vector. Displacement of macroblocks according to transposition transformation 540 is shown in FIG. 7.

Following transposition step 540, rotation 550 of pixel data in YUV color space is implemented by deriving rotation angles from a generated encryption key. As before, use of the same encryption key for all encryption transforms applied to a GOP simplifies bookkeeping for decryption. Generally, three angles are derived from the encryption key to specify a new color space orientation for the Y, U, V axes, and the components of each data point in the new YUV frame are calculated using Euler angles or other known transformations. Color space rotation is indicated schematically in FIG. 8.

Following encryption of a frame by substitution transformation 530, transposition transformation 540, and rotation transformation 550, the frame is compressed 560 using standard-compliant compression methods. A determination 570 is then made as to whether a new GOP should be generated. For example, an analysis of image quality may indicate that motion compensation within the current GOP no longer produces images of adequate quality, in which case a new GOP should be generated. On the other hand, when image analysis indicates 570 that a new GOP is not required, compressed frame data is stored 580 and the next frame of the GOP is prepared 584 for encryption.

As noted in conjunction with FIG. 4, compression module 330 manages the image monitoring necessary to determine when a new GOP should be generated, and asserts SYNC signal when this occurs to trigger encryption module 340 to generate a new encryption key for the next GOP. Thus, when it is determined 570 that a new GOP is required, method 500 determines 574 whether more data remains. If so, a new encryption key is generated 520 for the next GOP, offset values are derived 524, and transformation steps 530, 540, and 550 are repeated. When the last GOP of the video signal is detected 570, 574, encoding process 500 is complete.

Figure 6:
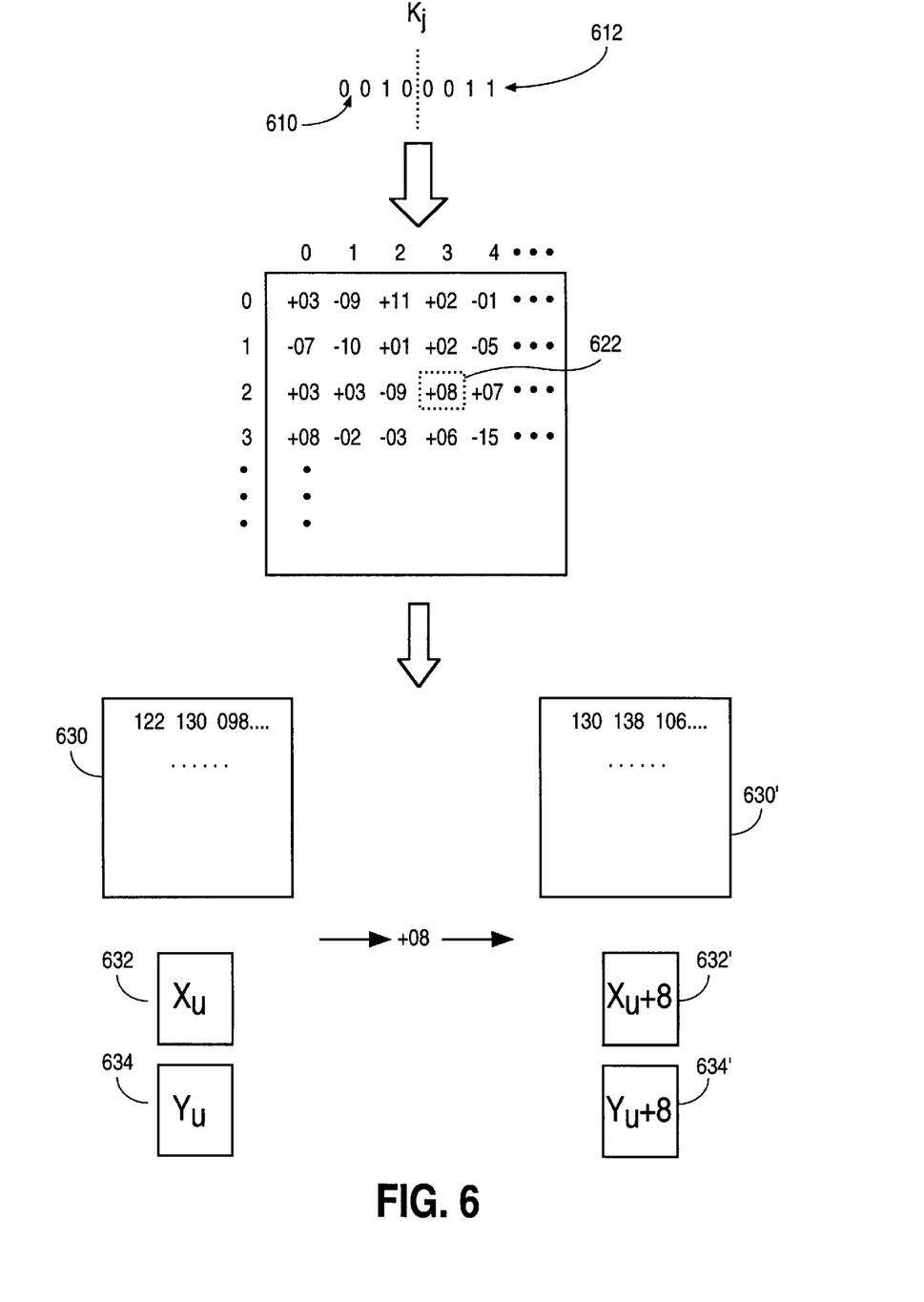
FIG. 6 is a schematic diagram of a synchronized substitution transformation in accordance with the present invention.

Referring now to FIG. 6, there is shown a schematic representation of substitution transformation step 530. $K_j$ represents an encryption key value 00100011 generated 520 for the $j^{th}$ GOP of the video signal. As indicated in the figure, first and second subsets 610, 612 of $K_j$ provide a row and column location 622 in S-Box substitution table 620. In the example, the entry at row 2, column 3 is +08, and this value is applied to the image data in each frame of the associated GOP.

Also shown in FIG. 6 are Y, U, and V frames 630, 632, 634, respectively, to be modified by the randomly selected offset value (08). The offset value is added to each component of Y, U, and V frames 630, 632, 634 to form substituted Y, U, and V frames 630', 632', 634'. This same offset is also added to every other Y, U, and V frame within the $j^{th}$ GOP.

In the preferred embodiment of the invention, the offset values of S-Box substitution table 620 are selected to have a gaussian distribution of values. This limits the effects of saturation roll-over. Roll-over occurs where the Y, U, or V components are modified to values outside a range specified by MAX, MIN values (typically, 0–255). Roll-over may be further limited by calculating a predictive decryption error and choosing offset values to minimize the anticipated error. This is done by including a rule in the encryption transform that causes a pixel value to be adjusted by half the offset value if the full adjustment moves the value above MAX or below MIN. In these cases, the inverse transform applies the modified offset to data values within specified ranges of MAX and MIN.

Referring now to FIG. 7, there is shown a schematic representation of transposition transformation step 540 for the $j^{th}$ GOP. In the preferred embodiment, the same encryption key value, $K_j$, used for the offset value of step 530 also provides X, Y displacement vectors for transposition step 540. As indicated in the figure, each Y frame 730, U frame 740, and V frame 750 of the $j^{th}$ GOP is organized into Y, U, and V macroblocks, consistent with MPEG standards. In order to facilitate tracking of macroblocks on transposition, the Y, U, and V macroblocks of Y, U, and V frames 730, 732, 734, respectively, in FIG. 7 are numbered. Using location indices (3,2) discussed in conjunction with FIG. 6, Y macroblocks 1–8 (and the remaining blocks that are not enumerated) are shifted 3 blocks to the right (in the positive X direction) and 2 blocks up (in the positive Y direction). Where a shift moves a macroblock off the Y-frame, the block is wrapped back onto Y-frame 730 on the opposite side. For example, as each of blocks 1, 2, and 5, 6 are shifted off the top edge of Y-frame 730 by the Y-displacement 3, they reappear at the bottom edge of Y-frame 730. Similar considerations apply to U, V frames 740, 750.

Figure 8:
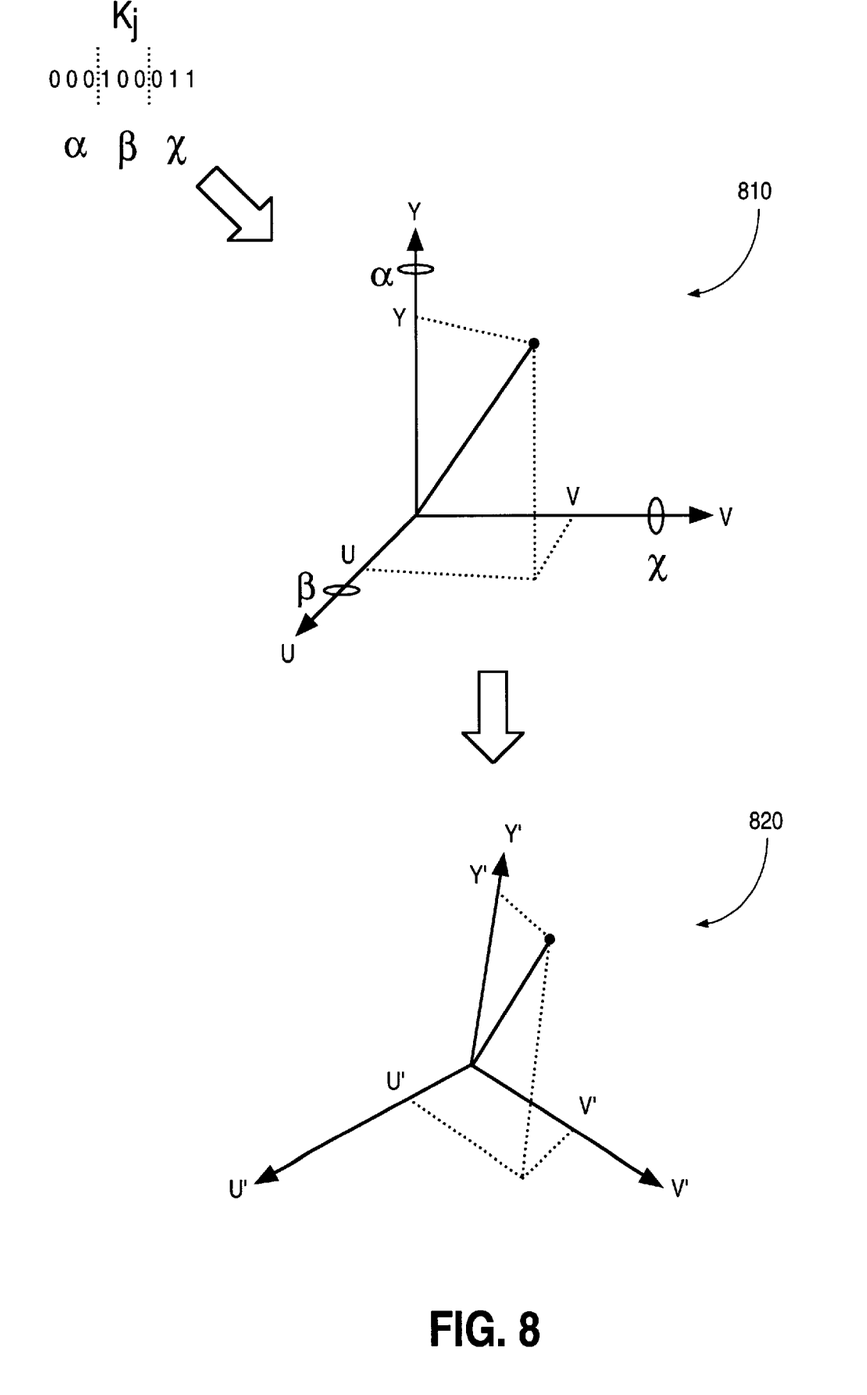
FIG. 8 is a schematic diagram of a synchronized rotation transformation in accordance with the present invention.

Referring now to FIG. 8, there is shown a schematic representation of rotation transformation step 550 in color space. In this case, encryption key for the $j^{th}$ frame, $K_j$, provides three numbers 0, 4, and 3, which can be converted into rotation angles $\alpha, \beta, \chi$ by appropriate scaling. Original YUV coordinate system 810 is then rotated by an amount specified through the angles $\alpha, \beta, \chi$ to generate a rotated coordinate Y'U'V' system 820. Pixel data 812 in YUV coordinate system has components y, u, and v in YUV system 810 and components y', u', v' in Y'U'V' system 820. Rotated components y', u', v'can be determined from y, u, v and angles $\alpha, \beta, \chi$. Reconversion to y, u, v is readily accomplished by inverting the coordinate rotations.

A data point that was originally within the specified MIN, MAX range, i.e. 0–255, may be moved outside this range by a rotation transformation. When this happens, the data that was originally unsaturated, will appear saturated. This rotation-induced saturation can be mitigated in a number of ways. Relatively simple approaches include ignoring these data points or setting them equal to the MIN, MAX values closest to the unrotated values. Alternatively, since rotations are volume preserving transformations, there will always be volumes in the rotated color space to which the "saturated-"data points can be mapped in a one-to-one manner. This approach preserves all color information contained in the original, i.e. unrotated, data.

The output of encoder 400 (FIG. 4) is encrypted video data compressed in accordance with MPEG standards. System level encoding of MPEG data includes a sequence header, followed by one or more GOPs, and ending with a sequence end code. Information specified in the sequence header includes the vertical and horizontal sizes of each picture (frame), the pixel aspect ratio, the bit rate, minimum buffer size needed, quantization matrices for compression, and other user data. This information allows a display system such as processor based video systems 302, 302' to decode the video data. Sequence headers for video data encoded in accordance with the present invention, may also include an encryption key(s) for each GOP in addition to the data specified above. Alternatively, encryption keys may be stored in a separate block and coupled between storage medium 150 and decryption module 362, 382 through a separate channel. One method for doing this is disclosed in related patent application, Key Management System for DVD Copyright Management.

Figure 9:
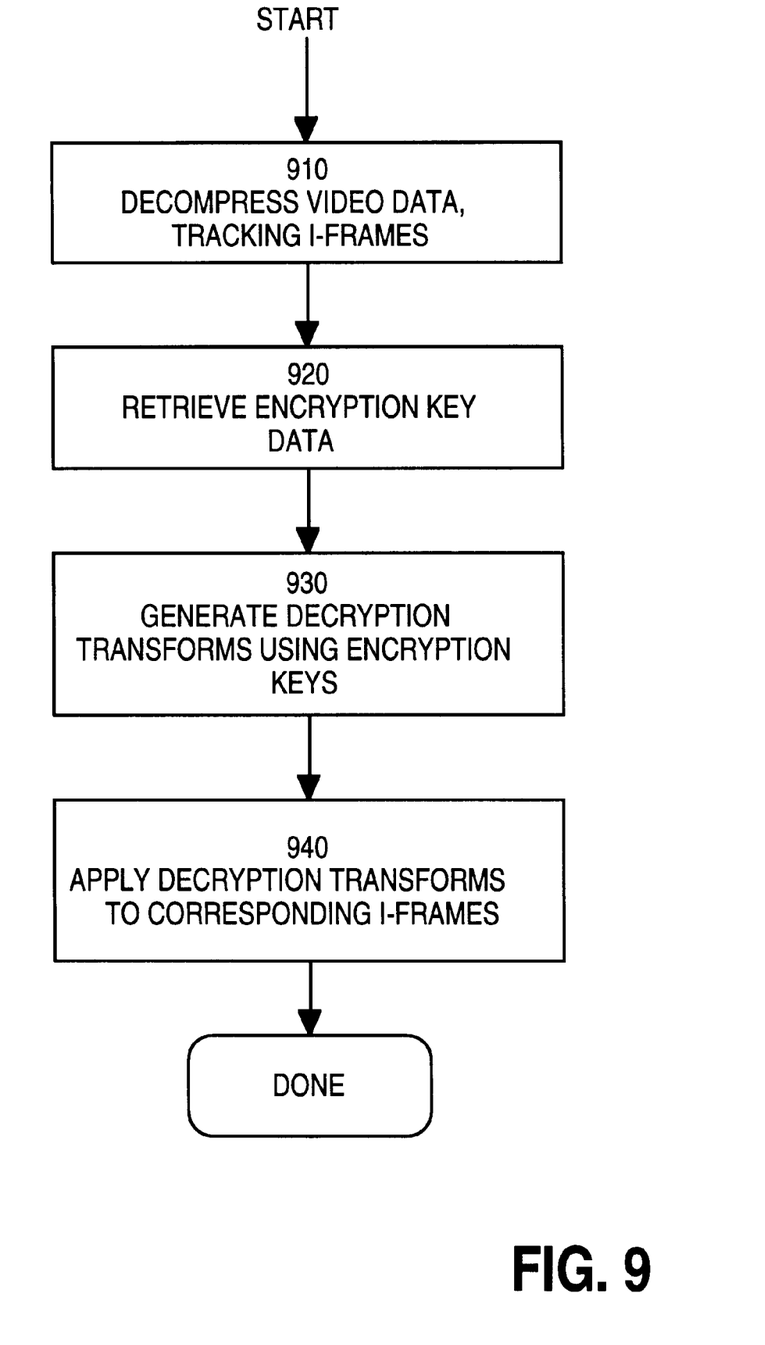
FIG. 9 is a flow chart of a method for decoding video data that has been encoded in accordance with the present invention.

Referring now to FIG. 9, there is shown a flow chart of method 900 for decoding video data that has been encoded in accordance with the present invention. In accordance with method 900, compressed, encrypted video data is decompressed 910 and encryption key data is retrieved 920. In one embodiment of the invention, the encryption keys are maintained in a file on storage medium 150 and decode control program 360 handles retrieval and synchronization of the encryption keys with their associated GOPs. As each GOP is decompressed and forwarded to decryption module 340', i.e. decryption logic 382 or decryption program 362, decode control program 360 provides the associated encryption key to decryption module 340'. A decryption transform appropriate for the GOP is generated 930, using the corresponding encryption key, and the decryption transforms are applied 940 to their corresponding GOPs. Decryption is complete when all GOPs have been decrypted using inverse transforms generated from the encryption key associated with the GOP.

There has thus been provided a method for encoding YUV video prior to compressing the video data and a method for decoding the compressed, encrypted video data for display. The encoding process employs GOP synchronized encryption transforms that are transparent to MPEG-compliant compression transforms. This transparency allows the original YUV data to be decrypted, by a processor-based video system without loss of encryption key data, despite intervening compression and decompression steps.

While the invention has been described in terms of several embodiments, persons skilled in the art will recognize that the invention is not limited to these embodiments, but may be practiced with modifications and alterations that fall within the scope of the appended claims.

What is claimed is:

1. A method for encoding video data comprising:

generating an encryption key for a GOP in the video data;

applying a transformation, parameterized by the encryption key, to the GOP;

compressing the transformed GOP.

2. The method of claim 1, wherein generating comprises:
generating a random number for the GOP; and
deriving an encryption offset from the random number.

3. The method of claim 2, wherein deriving comprises deriving an S-table location from the random number.

4. The method of claim 3, wherein applying comprises:
identifying a frame of pixel data within the GOP;
adjusting the pixel data within the frame by a value at the S-table location; and
repeating the identifying and adjusting steps for all frames within the GOP.

5. The method of claim 2, wherein deriving comprises deriving an offset vector from the random number.

6. The method of claim 5, wherein applying comprises:
identifying a frame, comprising macroblocks, within the GOP;
transposing the macroblocks of the frame according to the offset vector; and
repeating the identifying and transposing steps for all frames within the GOP.

7. The method of claim 2, wherein deriving comprises deriving a rotation angle from the random number.

8. The method of claim 7, wherein applying comprises:
generating a rotation transformation using the rotation angle;
identifying a frame of pixel data within the GOP;
applying the rotation transformation to the pixel data of the frame; and
repeating the identifying and applying steps for all frames within the GOP.

9. The method of claim 1, wherein applying comprises:
adjusting the transformation according to the encryption key;
identifying a frame within the GOP; and
applying the adjusted transformation to the frame.

10. The method of claim 9, further comprising repeating the identifying and applying steps for all frames within the GOP.

11. A method for encoding video data comprising:
identifying a series of GOPs in the video data;
associating an encryption key with each GOP of the video data; and
encrypting the video data of each GOP with the associated encryption key; and
compressing the encrypted video data.

12. The method of claim 11, wherein associating an encryption key with each GOP comprises selecting a randomly generated value for each GOP.

13. The method of claim 11, wherein identifying comprises:
transforming video data from an RGB format into a YUV format;
organizing frames of YUV formatted data into the series of GOPs; and
identifying macroblocks of YUV formatted data within each organized frame.

14. The method of claim 13, wherein encrypting comprises:
deriving an offset value for the YUV data of each GOP from the encryption key;
applying a substitution transformation to the YUV data of each GOP based on the offset value.

15. The method of claim 14, further comprising:

deriving an offset vector from the encryption key; and
applying a transposition transformation based on the offset vector to each macroblock of YUV data of the GOP.

16. The method of claim 11, wherein compressing the encrypted video data comprises:
compressing the substituted, transposed YUV data of the GOP with interframe and intraframe compression methods; and
storing the compressed, substituted, transposed YUV data on a storage medium.

17. A method for encrypting uncompressed video data represented as a series of GOPs, each of which GOPs includes a plurality of frames of YUV data that is organized in macroblocks, the method comprising:
generating a substitution transfer key for each GOP;
substitution transforming the YUV data of each frame of the GOP using a value derived from the substitution transfer key;
generating a transposition vector for each GOP; and
transposing the macroblocks of each frame of the GOP in accordance with the GOP transposition vector.

18. The method of claim 17, wherein substituting further comprises of:
deriving location indices from the substitution transfer key;
retrieving an offset value from a location in a substitution table specified by the location indices; and
adding the offset value to the YUV data of each frame of the GOP.

19. The method of claim 17, wherein generating a transposition vector for each GOP comprises generating a transposition vector for each GOP using the substitution transformation key for each GOP.

20. The method of claim 18, wherein generating a transposition vector for each GOP comprises deriving a transposition vector for each GOP from the location indices derived for the GOP.

21. The method of claim 17, further comprising:
compressing the substituted, transposed YUV data of the GOP using a hybrid interframe, intraframe compression method; and
storing the compressed, substituted, transposed YUV data on a storage medium.

22. A storage medium including the compressed, substituted, transposed YUV data generated by the method of claim 17.

23. A method for encrypting a GOP, including a plurality of frames of luminance/chrominance video data, the method comprising:
generating a substitution transfer value for the GOP; and
applying a substitution transformation to the luminance/ chrominance video data of each of the plurality of frames of the GOP, prior to compressing the luminance/ chrominance video data, using the substitution transfer value, to encrypt the data.

24. The method of claim 23, further comprising:
identifying a plurality of macroblocks of chrominance/ luminance data for each frame;
generating a transposition vector for the GOP; and
applying the transposition vector to the plurality of macroblocks of chrominance/luminance data of each frame.

25. The method of claim 24, wherein applying the substitution transformation to the luminance/chrominance data comprises:

deriving location indices from the substitution transformation value of the GOP;

retrieving an offset value from a substitution box using the derived location indices; and adding the retrieved offset value to the luminance/chrominance data of each frame of the GOP.

26. The method of claim 25, wherein generating the transposition vector for the GOP comprises setting components of the transposition vector equal to the location indices derived from the substitution key for the GOP.

27. A system for displaying video data encoded on a storage medium in encrypted, compressed format, the system comprising:

a bus;

an I/O device coupled to the bus for reading encoded video data from a storage medium and placing it on the bus;

a decompression module coupled to the bus, for decompressing encoded video data received through the bus; and a decryption module coupled to the bus to decrypt decompressed video data from the decompression module.

28. The system of claim 26, wherein the decompression module comprises:

a processor coupled to the bus;

and a memory associated with the processor and including a decompression program that is implemented by the processor.

29. The system of claim 26, wherein the decryption module comprises a decryption program in the memory that is implemented by the associated processor.

30. The system of claim 26, wherein the decryption module comprises a video decoder coupled to the bus and including decryption logic.

31. A machine readable medium on which are stored instructions that are executable by a processor to implement a method comprising:

generating an encryption key for a GOP in a video signal;

applying a transformation, parameterized by the encryption key, to the GOP; and compressing the transformed GOP.

32. The machine readable medium of claim 31, wherein applying comprises:

identifying a frame of pixel data within the GOP;

adjusting the pixel data within the frame by a value determined from the encryption key; and repeating the identifying and adjusting steps for all frames within the GOP.

33. The machine readable medium of claim 31, wherein generating comprises:

generating a random number; and deriving an offset vector from the random number.

34. A machine readable medium on which are stored instructions that are executable by a processor to implement a method comprising:

recovering an encryption key for a GOP in a video signal;

decompressing frames in the GOP; and decrypting the decompressed frames using the recovered encryption key.

35. The machine readable medium of claim 34, wherein decrypting further comprises applying one or more inverse transforms to the frames, the inverse transforms being parameterized by the encryption key.

36. The machine readable medium of claim 35, wherein the inverse transforms are selected from inverse macroblock substation, inverse macroblock transposition, and inverse color rotation transformations.

* * * * *